United States Patent [19]

Suggs et al.

[11] Patent Number: 5,785,322
[45] Date of Patent: Jul. 28, 1998

[54] GASKET FOR FLANGE CONNECTIONS

[75] Inventors: Steven M. Suggs; Reid M. Meyer, both of Atlanta, Ga.

[73] Assignee: Acadia Elastomers, Nacogdoches, Tex.

[21] Appl. No.: 746,744

[22] Filed: Nov. 15, 1996

Related U.S. Application Data

[63] Continuation of Ser. No. 409,309, Mar. 23, 1995, abandoned, which is a continuation-in-part of Ser. No. 387,369, Feb. 13, 1995, abandoned, which is a division of Ser. No. 85,549, Jun. 30, 1993, abandoned.

[51] Int. Cl.$^6$ ............................................................. F16J 9/00
[52] U.S. Cl. .................. 277/207 A; 277/213; 277/235 A
[58] Field of Search ............................. 277/207 R, 207 A,
277/211, 213, 215, 235 A, 180, 233; 285/368,
910, 917

[56] References Cited

U.S. PATENT DOCUMENTS

| 222,388 | 12/1879 | Doty . | |
|---|---|---|---|
| 843,394 | 2/1907 | Haynes | 277/213 |
| 854,135 | 5/1907 | Whittemore . | |
| 922,130 | 5/1909 | Goetze . | |
| 1,030,055 | 6/1912 | Darlington . | |
| 3,404,061 | 10/1968 | Shane | 161/125 |
| 3,542,382 | 11/1970 | Hagmann | 277/211 |
| 3,646,846 | 3/1972 | Houghton et al. | 87/1 |
| 3,781,043 | 12/1973 | Hagmann | 277/11 |
| 4,190,257 | 2/1980 | Schnitzler | 277/102 |
| 4,333,975 | 6/1982 | Booth | 428/65 |
| 4,422,894 | 12/1983 | Atkinson et al. | 156/62.2 |
| 4,432,408 | 2/1984 | Caines | 165/1 |
| 4,705,278 | 11/1987 | Locacius et al. | 277/235 |
| 4,797,956 | 1/1989 | Vogel | 75/243 |
| 4,810,454 | 3/1989 | Beltor | 264/271 |
| 4,895,713 | 1/1990 | Greinke et al. | 423/448 |
| 5,421,594 | 6/1995 | Becerra | 277/235 A |

FOREIGN PATENT DOCUMENTS

| 268134 | 3/1987 | European Pat. Off. . | |
|---|---|---|---|
| 0970950 | 10/1958 | Germany | 277/213 |
| 3309341 | 6/1984 | Germany | 277/213 |
| 3348345 | 12/1984 | Germany . | |

OTHER PUBLICATIONS

Grafoil Engineering Design Manual, Union Carbide Corp., 1987. pp. 3, 4, 7, 9, 10, 14.
Calgraph Technical Manual, Polycarbon Inc., Jul. 1, 1993. pp. 3.1, 3.2, 4.1, 4.2, 25.1, 25.2, 25.4, 25.5.
Graphite Engineering Design Manual, vol. 1, Union Carbide, p.v. 1, 4.2, 7, 11.1, 11.2, 13–16, 18, 19.1, 23.2, 28.1, 33, 37, 45. no date available.

*Primary Examiner*—Daniel G. DePumpo
*Attorney, Agent, or Firm*—Kennedy, Davis & Kennedy

[57] ABSTRACT

A gasket made of a plate having an annular central opening with an annular region concentric to the central opening, the annular region having a plurality of concentric deformable ridges and opposite facing grooves in a first and second surface of the plate. A sealing material comprising a plurality of expanded intercalated graphite worms overlies the annular region with the particles fixed to adjacent particles by compression. The ridges and the sealing material provide a plurality of seals having varying density and thickness that incrementally changes from a first edge of the sealing material to a second edge. The gasket is manufactured by compress the worms and the plate between dies to form the sealing material.

18 Claims, 5 Drawing Sheets

GASKET FOR FLANGE CONNECTIONS

This application is a continuation of application Ser. No. 08/409,309, filed Mar. 23, 1995, now abandoned, which is a continuation-in-part of application Ser. No. 08/387,369 now abandoned filed Feb. 13, 1995 which is a division of application Ser. No. 08/085,549 now abandoned filed Jun. 30, 1993.

TECHNICAL FIELD

The present invention relates to gaskets for flange connections. More particularly, the present invention relates to a gasket providing a plurality of seals having varying densities and thicknesses across the sealing surface and a method of manufacture.

BACKGROUND OF THE INVENTION

Pipes are used to communicate fluids in processing plants such as refineries, chemical plants, power plants, and the like. The fluids communicated through the pipes include gases and liquids. These fluids often are at high temperatures and pressures.

In routing pipes through the processing plants, sections of pipe must be connected together. Often two sections of pipe are joined together by annular flanges. The flanges each rigidly connect to an end of the respective pipe section. Although specific flange designs differ, generally, the flanges connect together by a plurality of bolts passing through the flanges, which are secured by nuts. The number of bolts, the spacing of the bolts, and the arrangement of the bolts around the flange depends primarily on the diameter of the pipes and the pressures of the fluid flowing through the pipes and the connection.

A gasket is used to seal the connection of the two flanges. The gasket effects a seal by deforming and filling surface irregularities between the mating flange surfaces. The internal pressure of the fluid flowing through the flange joint attempts to blow the gasket out from between the flange faces. Hydrostatic end force, which originates with the pressure of the confined fluid, attempts to separate the flange faces. Torqued bolts resist these forces to hold the flanges together with the gasket compressed between the flanges sealing the connection from leaks.

Various types of gaskets for sealing the flange connection have been described before. These gaskets include C-rings, and various types of plate-like gaskets, which have been widely used to seal flange joints. Such a gasket typically has a plate formed with a central opening that corresponds in size to the inner diameter of the pipes being connected. A sealing material is disposed around the central opening. The sealing material contacts the faces of the flanges to seal against fluid leakage through the rigidly connected flange joint. The plate is held in place by the bolts joining the flanges together.

The plate also included an annular region around the central opening. In some such gaskets, the annular region included a groove for receiving a deformable material for forming the seal. Another known gasket provided a plurality of deformable ridges and opposite facing grooves. Rigidly connecting the two flanges together compresses the ridges and the grooves forming a seal between the ridges and the inner face of the flanges.

A standard gasket in the sealing industry is known as a spiral wound gasket. The gasket is formed from a metal plate that includes the annular central opening and a concentric groove. Flexible graphite tape is wound a number of times around the central opening in the groove on both the first and the second surfaces of the plate. The wound tape forms an outwardly extending cylinder around the central opening. The plate with the outwardly extending cylinders made of the graphite tape is placed in a die. The cylinders of wound tape are then compressed into the groove in the face of the plate. For use as a seal, the gasket is placed in the flange and the flange members joined together by bolts. The tape extend outwardly to contact the flanges. As the flanges are tightened, the tape is crushed downwardly to form the seal between the plate and the flanges.

A round disc-shaped gasket is difficult to hold in place as the flanges are bolted together. To overcome this problem, a plate was provided with a plurality of radially extending fingers each having a varying width. The fingers permitted the gasket to be used with different sized flanges. As discussed above, the higher the pressure, the greater the number of bolts and the greater the diameter of the bolts. Each of the fingers slidably contact a respective bolt. The radially extending fingers align the gasket over the open ends of the pipes with the bolts extending between the flanges.

To facilitate holding the gasket in place during compression, the fingers in another gasket were divided to form V-shaped pairs of fingers. Each pair of fingers defined a groove. Each bolt was received in the groove between one of the adjacent pairs of fingers.

In another gasket, the corrugated annular region comprising the ridges and grooves received an annular disk or ring cut from a sheet of expanded graphite. The graphite ring seals the flange joint. The corrugations are flattened by an increased load over a flat plate. The flattened corrugations under a higher load prevent the gasket from moving under force. This prevents the gasket from being blown out of the flange joint during operation. The corrugations provide the gasket with a better seal because more load is delivered to the seal by the connection between the flanges.

The effectiveness of the sealing performance of a gasket depends on a number of factors. These factors include the finish of the face of the sealing surfaces on the flanges and on the gasket, the number and size of bolts used, the material of the bolts, operating conditions of the fluid flowing through the flange joint, the type of material used for the sealing member, and bolt prestressing.

Design and engineering for a gasket accordingly takes into consideration the effect each variable in the particular application has on the sealability. For example, a smoother finish on the sealing surface is less likely to resist creep or radial sliding of a gasket. A rougher finish, however, requires significantly higher bolt loads to make the gasket flow into flange imperfections. Operating conditions including pressures, temperatures, and fluid media typically dictate the sealing material for use in the gasket. Pressure typically has little direct effect on selection of most metal gaskets while it is a critical component of the selection for soft gasket sealing. Generally organic/fiber binder gasket sheets are generally not capable of performing in temperatures above 350° F. Flexible graphite sheets, however, best handles high temperature and chemical attack. Polytetafluoroethylene (PTFE) is known to be used in a few chemical applications where graphite is not recommended. Thinner gaskets have improved transfer of load over thicker gaskets. Use of thin gaskets, however, is not always feasible due to flange distortion and rigidity. Gaskets must be thick enough to assure that required sealing stress across the sealing surface in the event the flanges distort. The inability to predict flange irregularity, however, requires thicker gaskets to be used in most applications, to compensate for the few problem applications.

As discussed above, gasket sealing is accomplished by the flow of the seal material into the imperfections on the flange faces. The density of the seal material indicates how the material will respond or flow under load. Density is a ratio of the mass to a body to its volume. The lighter the density, the more responsive the gasket will be to surface irregularity. Without sufficient density, however, the pressure of the of the fluid flowing through the flange joint may blow the gasket out.

The configuration of the gasket itself must be considered. While flange gaskets are described as "flat", the sealing material typically should have a width-to-height ratio of no less than 4:1 for metal, no less than 8:1 for expanded graphite with binder material, no less than 12:1 for expanded graphite alone, and no less than 20:1 for PTFE. For example, a flange joint using a spiral wound gasket may tend to leak if the diameter of the raised face of the sealing material is much greater than the outer diameter of the gasket contact area.

The variability of these factors discussed above make it difficult to predict the specific performance of a gasket in a particular application. To help predict gasket performance, manufacturers developed evaluation factors known as M and Y factors by which manufacturers and end users of gaskets would standardize in order to compare the performance of one gasket with another.

The Y value provides an indication of the minimum stress required for the particular gasket to seal. The Y value represents the pressure over the contact area of the gasket required to provide a sealed joint without pressure in the joint. The Y value is the minimum seating stress in pounds per square inch. The Y value or actual seating stress is a direct function of the flange surface finish, the gasket material, the density, the thickness and the fluid to be sealed. Rough or irregular flange surface finishes are difficult to contain fluids. Traditional spiral wound gaskets provide for only one seating stress. Fluid leakage through the gasket having a given Y value indicates that the Y value for the gasket needs to be increased. Low minimum seating stresses usually are associated with soft metallic seal materials. This is desirable for maintenance because the material allows for flange irregularity while providing a larger margin for error during installation. Soft gaskets, however, tend to change consistency when exposed to temperatures, pressures, and fluid media over time. Also, soft gaskets are generally unacceptable at temperatures exceeding 350° F.

In response, spiral wound gaskets are typically selected for use because of relatively high seating stresses (10,000 psi minimum) and material stability. The gasket typically consists of a V-shaped formed plies of graphite sheet wound in a spiral with a soft separation such as graphite paper. The V-shape overcomes resiliency problems of the gasket. The density and configuration of the gasket is designed by predicting those variables most likely to occur in a specific flange application. In many cases, a "best" design is not used in favor of the design providing satisfactory performance over a wide spectrum of conditions.

The M value is a function of the gasket material and construction. The M value provides an indication of the sealing preload capability of the gasket to maintain the sealing pressure on the gasket after internal pressure is applied. Such gaskets accordingly provide a sealing member at a particular density and thickness.

Engineers and service technicians with responsibility for sealing and maintaining flange joints between pipes have differing theories as to effective sealing. One approach to sealing flange joints is to use the densest gasket possible to prevent blowouts. The high density provides an extremely stable sealing material. Such a gasket has a high Y value and a high M value. High density sealing materials, however, do not deform easily to conform the seal to irregular surfaces of the flange joint. Another approach then is to use a sealing material that is readily deformable so that it will conform to irregular flange surfaces. Such low density sealing materials have a low M value and a low Y value. Compressing the gasket between the flanges densities the soft material but the gasket is still susceptible to blowout at relatively low pressures. Thus, sealing flange joints between pipes involves engineering decisions and tradeoffs between the seating stress of the sealing material and the capability of the sealing material to adjust to changing conditions in the flange joint.

Accordingly, there is a need in the art for an improved gasket for sealing flange connections.

SUMMARY OF THE PRESENT INVENTION

The present invention provides an improved gasket for sealing flange connections. Generally described, the gasket of the present invention provides a seal for a flange connection with a seal material having varying differing density and thickness for effecting a seal at differing torques and wear conditions of the flanges to be sealed.

More particularly described, the gasket of the present invention seals a flange joint between two pipes. The gasket comprises a plate formed with an annular central opening. The plate includes an annular region concentric with the central opening. The annular region defines a containment area for receiving a seal material. The seal material comprises a plurality of expanded intercalated graphite worms fixed to the annular region and to each other and uniformly compressed. The seal material has a varying density and thickness across the annular region.

In one aspect of the present invention, the annular region is recessed in the plate for receiving the seal material. The radially outer edge of the annular region defines a wall that blocks movement of the seal material from the containment area when the gasket is installed in a flange joint. In another aspect of the invention, the annular region defines a plurality of concentric deformable ridges and opposite facing grooves in a first and second surface of the plate. The seal material overlies the annular region. The ridges bear against a respective face of the flange joint to be sealed. The laterally outermost surfaces of ridges receive the initial torque forces closing the flange joint together. These surfaces have the most dense seal material. As the flange joint is tightened together and the loading torque increases, the ridges tend to flatten thereby transferring the load to more of the ridge surface in contact with the faces of the flanges and into the less dense seal material in the gasket.

The present invention also provides a method of manufacturing a gasket for sealing a flange joint. Generally described, the steps of the method include uniformly compressing a plurality of expanded intercalated graphite worms overlying an annular region of a plate with a compressor. The compressor forcibly joins the worms together. The worms form a seal material having a density and thickness that varies across the sealing face of the gasket, for example, from one ridge to the next in the embodiment with the concentric ridges and grooves.

More particularly described, the method of manufacturing a gasket of the present invention comprises compressing the worms and the plate between a pair of lower and upper dies. The plate includes an annular region defining a containment area for receiving a seal material. The annular region in one embodiment is a recessed containment. In another embodiment, the annular region defines a plurality of concentric deformable ridges and opposite facing grooves in a first and second surface of the plate. The dies also each include an annular surface having concentric grooves and ridges that align with those in the plate. A plurality of expanded intercalated graphite worms are applied to the annular region of the lower die. The plate is positioned on top of the lower die. A plurality of expanded intercalated graphite worms are applied to the annular region of the plate. The upper die is then forcibly compressed against the lower die to form a sealing material of expanded intercalated graphite on the first and second surfaces of the plate in the annular region. More particularly described, the method of manufacturing a gasket for sealing a flange joint comprises placing a plate on a turntable. The plate is formed with a central annular opening and an annular region concentric with the central opening. In one aspect, the annular region is a recessed containment in a first and the second surfaces of the plate for receiving the seal material. In another aspect, the annular region defines a plurality of concentric deformable ridges and opposite facing grooves in the first and second surface of the plate. A plurality of expanded intercalated graphite worms are applied onto the annular region. A wheel rolls over the worms to compress the worms together and thereby form a seal material. The density and the thickness of the seal material in the containment area or on each ridge differs incrementally from a first edge of the seal material to a second edge.

In another aspect of the present invention, the wheel includes a flange at a first edge of the wheel. The flange compresses flash material of the expanded intercalated graphite against an inner rim surface of the plate during rotation to form a seamless seal material over the annular region and the face of the annular central opening in the plate.

In another aspect of the present invention, a support member for the wheel includes a brush adjacent a second radially outer edge of the wheel. The brush dislodges and moves flash particles from a radially outer edge of the annular region off of the plate.

Objects, features, and advantages of the present invention will become apparent from a reading of the following specification, in conjunction with the drawings and the appended claims.

BRIEF DESCRIPTION OF THE DRAWINGS

FIG. 2a illustrates the gasket shown in FIG. 1 between a pair of flanges before tightening. FIG. 2b illustrates the gasket after tightening the flanges.

DETAILED DESCRIPTION OF THE PREFERRED EMBODIMENT

Figure 1:
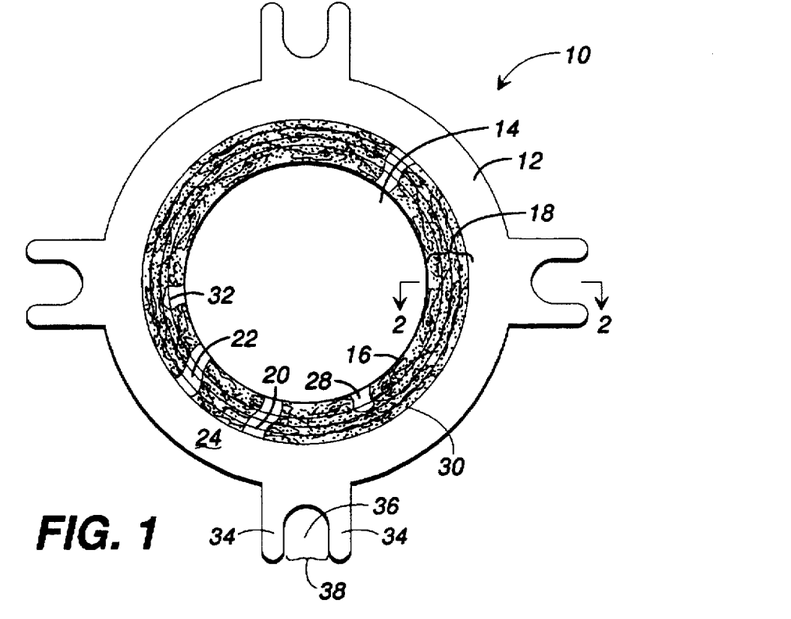
FIG. 1 is a plan view of a preferred embodiment of a gasket of the present invention.

Referring now in more detail to the drawings, in which like numerals indicate like parts throughout the several views, FIG. 1 shows a plan view of a preferred embodiment of the gasket generally at 10. It is to be understood that the present invention comprises a seal, and is referred to herein either as a seal or a gasket. The gasket 10 comprises a plate 12 having an annular central opening 14. The annular opening 14 defines an inner rim surface 16 of the plate 12.

The plate 12 includes an annular region generally designated 18 concentric with the central opening 14. The annular region 18 comprises a containment area for receiving a seal material, as discussed below. In the embodiment illustrated in FIG. 1, the annular region 18 includes a plurality of concentric ridges 20 and opposite facing grooves 22 in a first surface 24 and a second surface 26 of the plate 12 (best illustrated in FIG. 2). The grooves 22 on the first surface 24 define the ridges 20 on the second surface 26 of the plate 12. The annular region 18 has a first edge 28 outwardly of the inner rim 16 of the plate 12 and a second edge 30 spaced outwardly from the first edge 28. The first edge 28 of the annular region 18 is radially inward and the second edge 30 is radially outward. In an alternate embodiment illustrated in FIG. 6 (discussed below), the annular region 18 comprises a recessed area in the first and second surfaces 24 and 26 of the plate 12. The annular region 18 receives a sealing material 32 (illustrated in FIG. 1 as covering a portion of the annular region) for making a seal between a pair of flanges in a connection between two pipes, as discussed below.

The sealing material 32 comprises a plurality of particles which are compressed together in the annular region 18, as discussed below. The particles are built-up in the annular region to form an integral seamless blanket. In a preferred embodiment, the particles are expanded intercalated flake graphite. Intercalated flake graphite is formed by treating natural or synthetic graphite flake with an intercalating agent such as fuming nitric acid, fuming sulphuric acid, or mixtures of concentrated nitric acid and sulphuric acid. The intercalated flake graphite is then expanded at high temperatures to form a low density, worm-like form of particulate graphite having typically an eighty-fold increase in size over the flake raw material. The production of intercalated flake graphite as an intermediate step in the production of expanded intercalated graphite is described in U.S. Pat. No. 3,404,061. Expanded intercalated graphite particles have thin structural walls and are light-weight, puffy, airy, and elongated worms.

The illustrated embodiment of the gasket 10 includes four pairs of arms 34 spaced apart around the periphery of the plate 12. An alternate embodiment (not illustrated) includes two pair of arms. Each pair of arms 34 define a substantially V-shaped channel 36 with outwardly tapering edges 38. The channels 36 facilitate receiving the bolts used for the connecting flanges together, as discussed below. In an alternate embodiment (not illustrated) the plate 12 can be circular or rectangular in plan view with bores for receiving the bolts. As discussed below, the preferred embodiment is more easily installed due to the channels 36 functioning to self-align the plate 12 with the bolts.

Figure 2A:
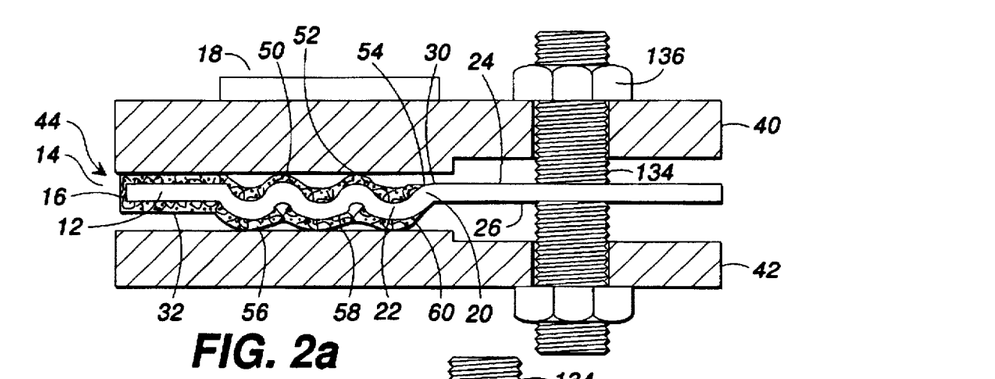
FIGS. 2a and 2b are cross-sectional views taken along lines 2—2 of FIG. 1 with an exaggerated vertical scale to illustrate features of the present invention.
Figure 2B:
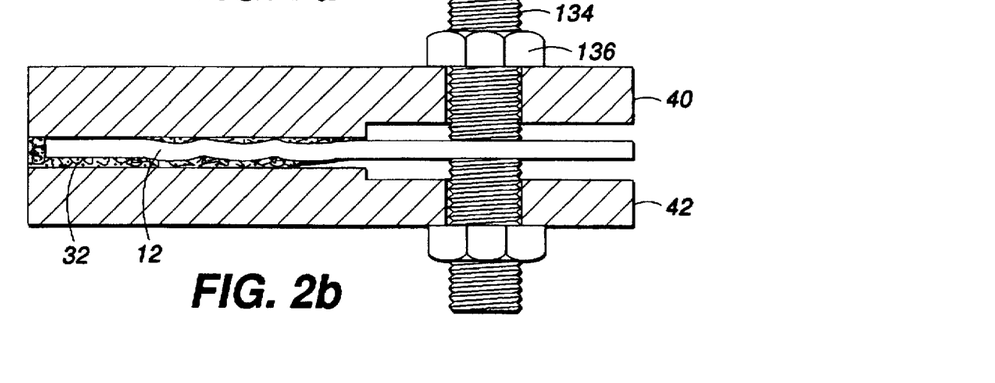

FIGS. 2a and 2b are cross-sectional views of the gasket 10 (taken along line 2—2 of FIG. 1) disposed between a pair of flanges 40 and 42. FIG. 2a illustrates the gasket 10 between the flanges 40 and 42 before tightening. FIG. 2b illustrates the gasket 10 after tightening, as discussed below. The flanges 40 and 42 form a connection 44 between two pipes carrying a fluid. The annular region 18 is spaced outwardly of the central opening 14. The annular region 18 includes the ridges 20 and the oppositely facing grooves 22 in the first and second surfaces 24 and 26 of the plate 12. The sealing material 32 forms a unitary skin overlying the annular regions 18 on the first and second surfaces 24 and 26 of the plate 12. The sealing material 32 extends between the second edges 30 across the annular regions 18 and the inner rim 16. The sealing material 32 thereby covers the portions of the plate 12 which are exposed to the fluid communicated through the connection 44. The ridges 20 together with the sealing material 32 form discrete seals 50, 52 and 54 on the first surface 24 against the flange 40 and seals 56, 58 and 60 on the second surface 26 against the flange 42. The density and thickness of the sealing material 32 varies among the seals 50–60. In a preferred embodiment, the density and thickness of the sealing material 32 incrementally changes from the first edge 28 to the second edge 30 of the sealing material 32. In the illustrated embodiment, the sealing material 32 on the seals 50 and 56 is more dense and thinner than on the seals 54 and 60 which are less dense and thicker.

Figure 3:
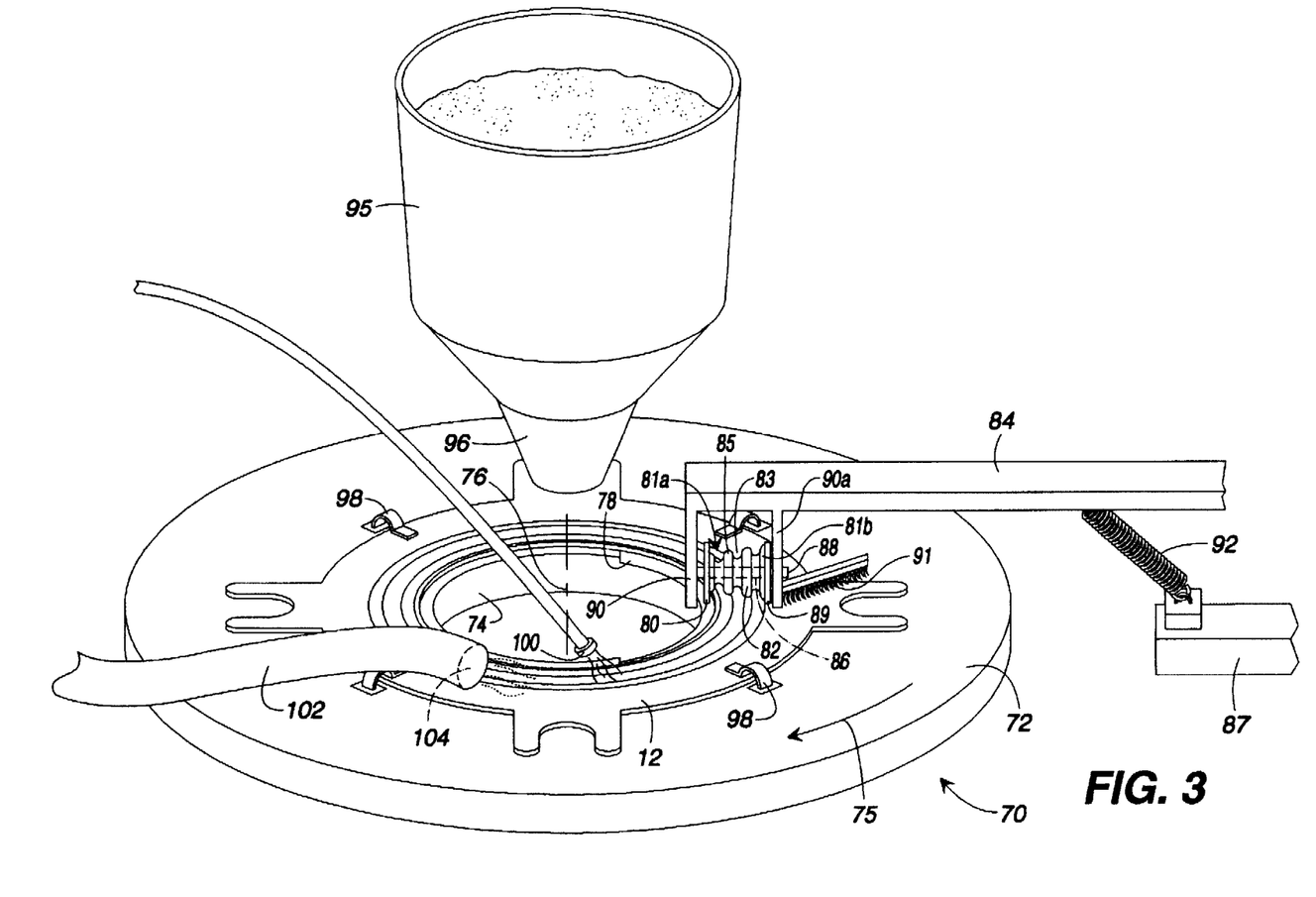
FIG. 3 is a perspective view of an apparatus for manufacturing the gasket illustrated in FIG. 1.

FIG. 3 illustrates a perspective view of an apparatus 70 for manufacturing the gasket 10 illustrated in FIG. 1. The apparatus 70 includes a rotatable turntable 72 having an annular sleeve 74 extending upwardly. An axis 76 of the sleeve 74 is centered on the axis of rotation for the turntable 72. The turntable 72 connects to a motor or other drive mechanism for rotating the turntable in a direction of rotation indicated by the arrow 75. In a preferred embodiment, the turntable 72 rotates at about 6 revolutions per minute (rpm). The sleeve 74 includes a notch 78 on one side. The notch 78 receives a flange 80 of a wheel 82. The wheel 82 rotatably mounts to a support generally designated 84 that pivotably connects to a frame 87. The wheel 82 has a surface of grooves 83 and ridges 85 that correspond to the ridges 20 and grooves 22 in the annular region 18. The wheel 82 includes a taper, which viewed in cross-section, provides the wheel with a larger diameter on a first side 81a than on a second side 81b, for a purpose discussed below. In the illustrated embodiment, a second flange 89 extends outwardly from the surface of the wheel 82 for a purpose discussed below. The wheel 82 includes a bore 86 through which a pin 88 extends. Each of the longitudinal ends of the pin 88 connects to one of a pair of plates 90 connected to the support 84. A brush 91 attaches to the plate 90a. The brush 91 extends outwardly from the plate 90a towards an outer edge of the turntable 72, for a purpose discussed below. A spring 92 connects between the support 84 and the frame 85 to bias the support 84 downwardly against the turntable 72. The support 84 pivotally connects to the frame 85, so that the wheel 82 can be moved away from the turntable 72 in order to position a plate 12 on the turntable.

A hopper 95 attaches to a frame member (not illustrated) on a second side of the apparatus 70 away from the support 84. The hopper 95 receives a plurality of powder-like particles. The hopper 95 forms a funnel-like open end 96 which is disposed above the turntable 72 near the sleeve 74. A plurality of clips 98 connect to the turntable 72 on an upper surface. The clips 98 move between a first open position and a second closed position, for a purpose discussed below.

A nozzle 100 is disposed above the turntable 72 near the sleeve 74 and spaced apart from the hopper 94. The nozzle 100 connects to a supply of adhesive. The nozzle 100 is spaced above the turntable 72, for a purpose discussed below. An air hose 102 includes an outlet 104 held above the portion of turntable 72 that would be occupied by the annular region 18 of the plate 12. The air hose 102 connects to a blower (not illustrated) for communicating air on to the plate 12 held on the turntable 72. As discussed below, the air dries the adhesive sprayed onto the annular region of the plate.

Figure 4:
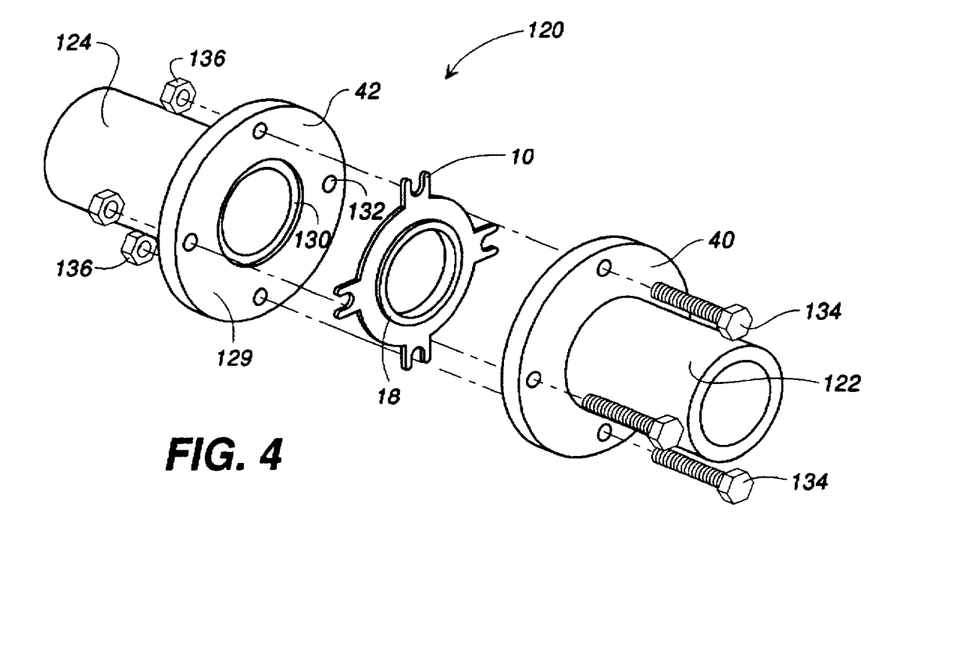
FIG. 4 is a perspective view of the gasket illustrated in FIG. 1 for sealing a flange joint between two pipes.

FIG. 4 is a perspective exploded view of a flange joint 120 with the gasket 10 for use to seal the coupling of a pair of pipes 122 and 124. Each of the pipes 122 and 124 includes a flange such as the flanges 40 and 42. The flanges 40 and 42 each rigidly connect at an end 130 of the respective pipes 122 and 124. Each of the flanges 40 and 42 includes an annular face 129 surrounding the open end 130 of the respective pipes 122 and 124. Each flange 40 and 42 includes a plurality of bolt holes 132 spaced in a predetermined pattern around the flange. In the illustrated embodiment, the flanges 40 and 42 have four bolt holes. The number, spacing and arrangement of the bolt holes depends on the size of the pipes and the pressure of the fluids carried in the pipes, as is known in the industry. A plurality of bolts 134 extend through the respective bolt holes 132. A nut 136 is received on each bolt 134 to rigidly connect the flanges 40 and 42 with the gasket 10 therebetween. The gasket 10 seats between the flanges 40 and 42 prior to bolting the flanges together. The annular regions 18 with the sealing material 32 contacts the respective faces 129 of the flanges 40 and 42 to seal against fluid leakage from the pipes 122 and 124. Particularly, the ridges 20 with the sealing material 32 form the discrete seals 50, 52, and 54 on the first surface 24 in contact with the face 129 of the flange 40 and the discrete seals 56, 58, and 60 on the second surface 26 in contact with the face 129 of the flange 42, as best illustrated in FIG. 2.

Figure 7:
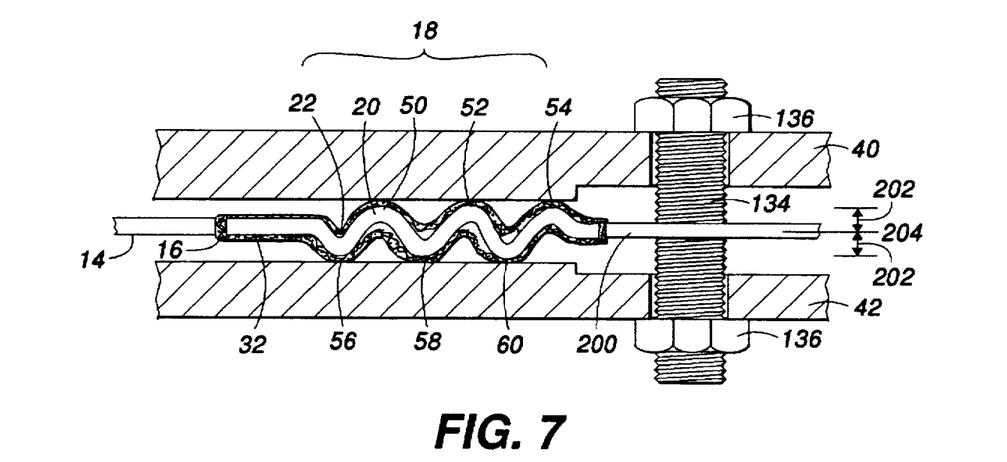
FIG. 7 illustrates a preferred gasket between a pair of flanges before tightening.

FIG. 7 is a cross-sectional view of a preferred embodiment 200 of the gasket of the present invention disposed between a pair of flanges 40 and 42 before tightening nuts 136 on bolts 134 to join the flanges together for connecting two pipes. The gasket 200 comprises the plate 12 having a thickness of between about 0.010 inches and 0.050 inches. The annular region 18 is radially outward of the central opening 14. The annular region 18 includes the ridges 20 and the oppositely facing grooves 22 in the first and second surfaces 24 and 26 of the plate 12. In this preferred embodiment, the height 202 of the ridges 20 are equal on both sides of a longitudinal axis 204 through the gasket 200. The ridges 20 and grooves 22 are corrugations pressed into both sides of the plate 12 by stamping dies. The annular region 18 after corrugation has a peak-to-peak top surface 24-to-bottom surface 26 thickness of between about 0.050 inches and 0.140 inches. The ridges accordingly reach peaks having heights of between about 0.025 inches and 0.070 inches above a plane defined by the axis 204.

The sealing material of expanded intercalated graphite worms 32 forms a unitary skin overlying the annular regions 18 on the first and second surfaces 24 and 26 of the plate 12. The sealing material 32 extends between the radially outer second edges 30 across the annular regions 18 and the face of the inner rim 16. The sealing material 32 thereby covers the portions of the plate 12 which are exposed to the fluid communicated through the connection 44. The sealing material 32 forms a seamless blanket over the portions of the plate exposed to the fluid. The ridges 20 together with the sealing material 32 form discrete seals 50, 52 and 54 on the first surface 24 against the flange 40 and seals 56, 58 and 60 on the second surface 26 against the flange 42.

Figure 8:
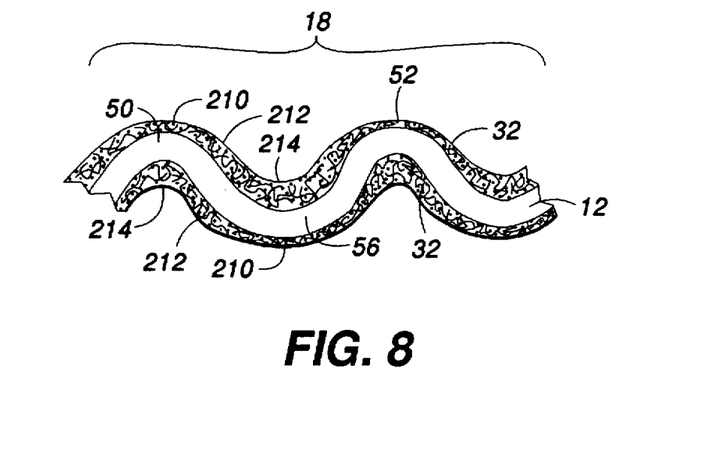
FIG. 8 is an enlarged cross-sectional view of a portion of the gasket illustrated in FIG. 1.

FIG. 8, an enlarged cross-sectional view of the annular region 18, is exaggerated to illustrate the variation of the density and thickness of the sealing material 32 from peak to peak of the ridges 50, 52, and 54 and likewise from peak to peak of the ridges 56, 58, and 60 among the seals 50–60. In the illustrated embodiment, the sealing material 32 on the peaks 210 of the seals is more dense and thinner than on the tapered sides 212 of the ridges on which the seal material is less dense and thicker. The density of the sealing material 32 varies from about 30 pounds per cubic foot in the valleys 214 to about 130 pounds per cubic foot on the peaks 210. The thickness of the sealing material 32 varies from about 0.002 inches on the peaks 210 to about 0.030 inches in the valleys 214.

The gasket 10 of the present invention is manufactured by forming the plate 12 of metal or other deformable material. The plurality of ridges 20 and the grooves 22 are pressed in the surfaces 24 and 26 of the plate 12 to define the corrugated annular region 18 concentric with the central opening 14. The central opening 14 corresponds in diameter to the diameter of the pipes 122 and 124 to be connected together.

Figure 5:
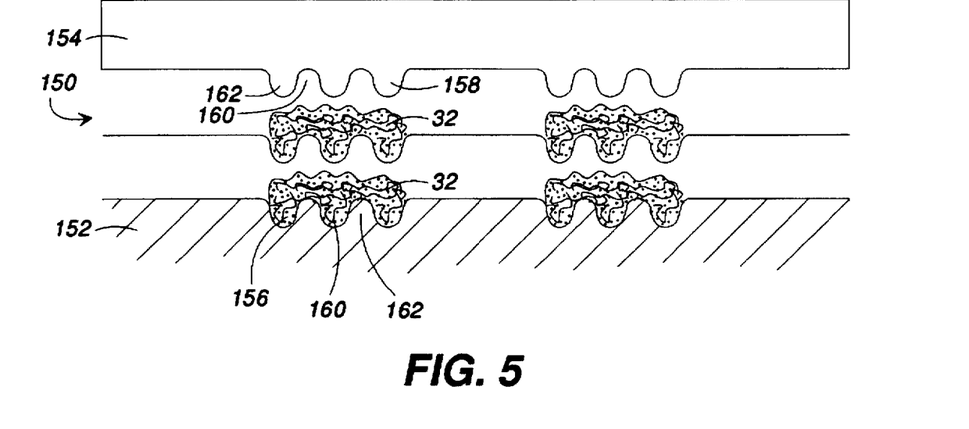
FIG. 5 is a cross-sectional view of a die for manufacturing the gasket illustrated in FIG. 1.

FIG. 5 is cross-sectional view of a die 150 for manufacturing the gasket 10 illustrated in FIG. 1. The die 150 comprises a lower die 152 and an upper die 154. The dies 152 and 154 each include an annular surface 156 and 158, respectively. The surface 156 is recessed in the die 152 while the surface 158 is extended outwardly from the surface of the die 154. Each surface 156 and 158 define concentric grooves 160 and ridges 162 that align with the ridges 20 and the grooves 22 of the plate 12. The die 152 preferably is fixed while the die 154 preferably is movable under hydraulic power against the die 152.

The die 150 is used to manufacture a gasket 10 of the present invention. The recessed surface 156 of the die 152 is filled with a plurality of powder-like particles. The plate 10 is positioned on top of the lower die 152 with the annular region 18 aligned with the annular region 156. A plurality of powder-like particles are then applied to the annular region 18 of the plate 10. The upper die 154 is then forcibly pressed against the plate 10 and the lower die 156 to compress the particles to form the sealing material 32 on the gasket 10. This forms the sealing material 32 on the first and second surfaces of the plate 10. Although not illustrated, alignment pins can be used to maintain the plate 12 in alignment with the dies 152 and 154 during manufacture. A film of adhesive can be applied to the annular regions on the plate 12 before placing the plate on the lower die 152.

Figure 9:
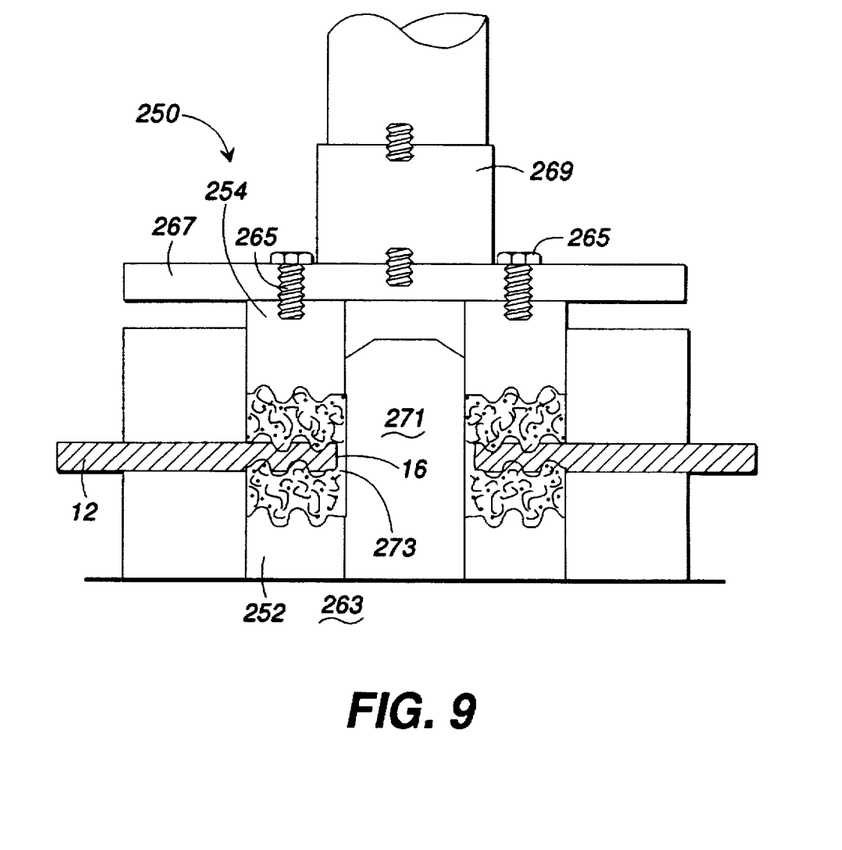
FIG. 9 is a cross-sectional view of a die for manufacturing the gasket illustrated in FIG. 1.

FIG. 9 is cross-sectional view of an alternate die 250 for manufacturing the gasket 10 illustrated in FIG. 1. The die 250 includes an annular lower die 252 and an annular upper die 254 with surfaces 256 and 258, respectively, that define concentric grooves 260 and ridges 262 that align with the ridges 20 and the grooves 22 of the plate 12. The die 252 preferably is fixed in a support 262 while the die 254 is preferably attached with bolts 265 to a plate 267 at a distal end of a hydraulic piston 269. A pin 271 extends upwardly from the support 263 for receiving the annular central opening 14 of the plate 12. In a preferred embodiment, the outer diameter of the pin 271 is less than the inner diameter of the central opening 14, thereby leaving a gap 273 between the pin and the inner rim surface 16.

The die 250 is used to manufacture the gasket 10 of the present invention. The upper surface 256 of the die 152 is covered with a plurality of the expanded intercalated graphite worms to fill the cavity in the die. The plate 10 is positioned on top of the lower die 252 with the annular region 18 aligned with the annular region 256. A plurality of the expanded intercalated graphite worms are then poured onto the plate 10 in the upper portion of the cavity in the die 250. The upper die 254 is then forcibly pressed against the worms, the plate 10, and the lower die 156 in the die 250 to compress the worms to form the sealing material 32 on the gasket 10. The pressure compresses the worms in the gap 273 for applying the sealing material 32 on the rim surface 16 of the gasket 10. This forms the sealing material 32 on the first and second surfaces 24 and 26 of the plate 10 as well as on the rim face 16. Although not illustrated, alignment pins can be used to maintain the plate 12 in alignment with the dies 152 and 154 during manufacture. A film of adhesive can be applied to the annular regions 18 and the rim face 16 on the plate 12 before placing the plate in the die 250.

The plate 12 is then ready for installation as a gasket 10 in a flange connection 120 as illustrated in FIG. 4. The plurality of bolts 134 are positioned in the bolt holes 132 of the flange 128. The gasket 10 is attached to the bolts by pressing the plate 12 against the face 129 with the bolts 134 received in the channels 36 between the pairs of adjacent arms 34. The flange 40 is brought into contact with the gasket 10 and the second flange 42 with the bolts 134 extending through the bolt holes 132. The nuts 136 are threaded on the bolts 134 to secure the flanges 40 and 42 together. The bolts are tightened in a conventional sequence known in the industry for the number and arrangement of the bolts. Tightening the nuts 136 on the bolts 134 compresses the gasket 10 between the faces 129 of the flanges 126 and 128. The ridges 20 with the sealing material 32 form the seals 50, 52, and 54 between the plate 12 and the flange 126 and the seals 56, 58, and 60 between the plate and the flange 128.

With reference to FIG. 3, the plate 12 is positioned on the turntable 72 with the sleeve 74 extending upwardly through the central opening 14 of the plate. The clips 98 are moved from the first open position to the second closed position in which the clips bear against the plate 12 to secure the plate to the turntable 72. In an alternate embodiment (not illustrated), the turntable 72 includes a plurality of threaded bores which correspond in position to the channels 36 in the plate 12. Threaded connectors, such a bolts, are received in the threaded bores for securing the plate to the turntable 72.

The turntable 72 is rotated slowly by the drive motor (not illustrated) or other drive means. This causes the plate 12 to also rotate. The nozzle 100 is operated to spray a film of the adhesive onto the annular region 18 and the rim 16 of the plate 12. In a preferred embodiment, the film is about 1 mill thick. The blower (not illustrated) is then started. Air moves through the air hose 102 and over the annular region 18 to dry the adhesive. Several rotations may occur before the adhesive is fully dry. In a preferred embodiment, the adhesive is Resin 701 manufactured by Rohm & Haase Corporation. This adhesive provides advantages including chemically inert, high temperature range, and flame retardant. The blower is turned off after the adhesive is dry. The hopper 95 is then opened to allow the powder-like particles, preferably expanded intercalated graphite worms, to flow through the open end 96 onto the annular region 18 as the plate 12 rotates on the turntable 72. The particles adhere to the adhesive and collect in a mound on the annular region 18. In a preferred embodiment, the particles contact the adhesive but are not embedded in the adhesive.

The plate 12 continues to rotate and carry the particles under the wheel 82. The wheel 82 rotates and compresses the particles together to form the sealing material 32. The grooves 83 and ridges 85 in the wheel 82 align with the grooves 22 and ridges 20 in the annular region 18 to compress the particles onto the annular region. The flange 80 of the wheel 82 overlaps the rim surface 16 of the plate 12. Flash particles of the sealing material fall from the first edge 28 over the rim surface 16. The flange 80 compresses the flash particles against the rim surface 16. The flange 89 on the second side 81b of the wheel 82 cuts flash particles from the second edge of the sealing material 32. The brush 91 attached to the support member 90a moves the flash particles from the second edge 30 off of the plate 12 as the turntable 72 rotates. In an alternate embodiment, the wheel 82 is rotated by a second motor (not illustrated) or other mechanism connected to the drive for the turntable.

The wheel 82 rolls over the particles of the sealing material 32 in the annular region. The wheel 82 compresses the particles together to form the sealing material 32. The taper of the wheel 82 varies the distance between the wheel surface and the plate 12 across the annular region 18. The density and the thickness of the sealing material 32 compressed under the wheel 82 thereby varies across the annular region 18. In the illustrated embodiment, the density of the sealing material 32 on the first edge 28 is greater than on the second edge 30. Similarly, the thickness of the sealing material 32 on the second edge 30 is greater than on the first edge 28. The density and the thickness of the sealing material incrementally changes across the ridges 20 and grooves 22 in the annular region 18 from the first edge 28 to the second edge 30. The ridges 20 with the sealing material 32 form the discrete seals 50, 52, and 54 on the first surface 24 of the plate and the discrete seals 56, 58, and 60 on the second surface 26.

The particles forming the sealing member 32 are compressed at a uniform load across the ridges 20 and the grooves 22. The density of the sealing material 32 thereby varies across the face of the gasket according to the depth of the grooves 22. This allows for the density of the sealing material 32 to be as high as about 130 pounds per cubic foot at the peak of the ridges 20 and as low as about 30 pounds per cubic foot in the bottom of the grooves 22. The high density provides a seal for high pressure while the low density compensates for rough or irregular flanges. As discussed above, the thickness of the seal material also varies across the face of the gasket according to the depth of the grooves 22. As the flanges 40 and 42 are closed by tightening the bolts 134, the ridges 20 and grooves 22 are reformed until the gland is at the full closing pressure (as best illustrated in FIG. 2b). The clamping force of the bolts 134 on the flanges 40 and 42 transfers to the seals 50–60. The thickness and density of the sealing material 32 in the ridges 20 and grooves 22 varies, as discussed above.

The gasket 10 of the present invention accordingly provides seals with differing unit pressures across the sealing face. The gasket 10 seals at low bolt torque due to the low density areas while providing extremely high unit loads in the higher density areas. This assures that the unit loads on the gasket are greater than the internal pressures when the compressive force has been relieved by hydrostatic end force. The gasket 10 thereby provides a varying range of M and Y values formed with uniform molding pressure, as the profile of the sealing material 32 varies with the differing angles in the ridges 20 and grooves 22. The gasket 10 in its uncompressed state varies in density and thickness along the curved surfaces of the annular region 18. The densities tend to become more uniform as the flanges 40 and 42 are tightened against the gasket 10, thereby giving the gasket the effect of being molded in place.

After the sealing material 32 is formed on the annular region 18 on the first surface 24, the plate 12 is removed from the turntable 72, flipped over, and re-secured to the turntable as described above. The sealing material 32 is then similarly formed on the annular region 18 on the second surface 26 of the plate 12.

Figure 6:
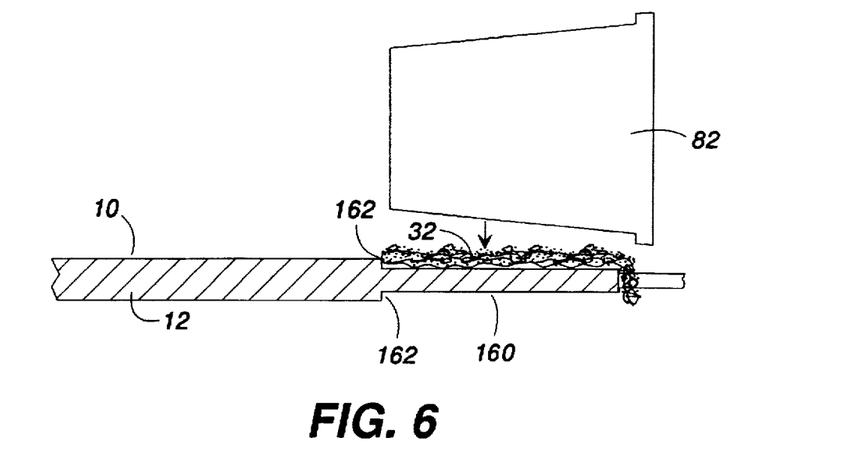
FIG. 6 is a side view of an alternate embodiment of the gasket of the present invention.

In an alternate embodiment illustrated in FIG. 6, the annular region 18 defines a recessed containment area 160 in the first and the second surfaces 24 and 26 of the plate 12 with a wall 162 on the outer diameter of the annular region. The recessed containment 160 receives the plurality of particles for forming the seal material 32, as discussed above. The wall 162 restricts movement of the seal material 32 from the containment when the gasket 10 is used to seal a flange joint. The density and the thickness of the seal material 32 varies, as discussed above, to provide a seal across the face of the gasket 10 with incremental M and Y values to meet a variety of sealing applications. For manufacturing this alternate embodiment, the wheel 82 illustrated in FIG. 3 is smooth and tapered as discussed above. The dies 152 and 154 illustrated in FIG. 5 similarly are tapered to provide incremental differences in density and thickness of the seal material 32.

The present invention accordingly provides a gasket 10 which seals a variety of flanges that differ according to specific application conditions and factors. The gasket uses the desirable attributes of both soft and high density sealing materials without having to design or engineer a specific gasket for each particular flange joint.

The specification has thus described in various embodiments, including the preferred embodiment, the gasket of the present invention, including the manufacture and use thereof. It is to be understood, however, that numerous changes and variations may be made in the construction of the present invention. It should therefore be understood that modifications to the present invention may be made without departing from the scope thereof as set forth in the appended claims.

What is claimed is:

1. A gasket for sealing a flange joint having two substantially parallel surfaces for connecting two pipes together, comprising:
    a plate formed with an annular opening;
    an annular corrugated region between the opening and a peripheral edge of the plate defined by a plurality of concentric deformable ridges that each define a peak and opposite facing grooves that each define a valley, on respective opposing sides of the plate;
    a plurality of intercalated graphite vermiform compressed around the annular region to form an integrally molded seamless jacket having uniform stability in all directions overlying at least the annular region, the density of the blanket increasingly changing from a first density in the valleys of the grooves to a second density at the peaks of the ridges, said second density greater than said first density, and the thickness of the blanket decreasingly changing from a first thickness in the valleys of the grooves to second thickness at the peaks of the ridges, said second thickness being thinner than said first thickness.

2. The gasket as recited in claim 1, wherein the plate is between about 0.010 inches and 0.050 inches thick.

3. The gasket as recited in claim 1, wherein the ridges extend laterally an equal distance from the respective opposing surfaces to the peaks of the ridges.

4. The gasket as recited in claim 1, wherein the ridges each have a height which is in a range from between about 0.025 inches to about 0.070 inches from a plane defined by a transverse axis through the plate.

5. The gasket as recited in claim 1, wherein the density of the seal material ranges from between about 30 pounds per cubic foot in the valleys of the grooves to about 130 pounds per cubic foot on the peaks of the ridges.

6. The gasket as recited in claim 1, wherein the thickness of the seal material ranges from about 0.0002 inches on the peaks of the ridges to about 0.030 inches in the valleys of the grooves.

7. The gasket as recited in claim 1, further comprising at least one pair of arms extending radially from the periphery of the plate for aligning the plate with at least two bolts in a joint between two pipes.

8. The gasket as recited in claim 1, wherein the seal material covers a radially inner face of the annular central opening in the plate.

9. The gasket as recited in claim 1, wherein the blanket of expanded intercalated graphite worms overlies an inner face portion of the annular opening in the plate.

10. A gasket for sealing a flange joint connecting two pipes together, comprising:

a plate formed with an annular central opening;

an annular region between the central opening and a peripheral edge of the plate; and a seal material comprising a plurality of expanded intercalated graphite worms compressed together to form a seamless blanket overlying the annular region, the density of the seal material increasingly changing from a first density at a radially inner edge of the seal material to a second density at a radially outer edge of the seal material.

11. The gasket as recited in claim 10, wherein the annular region comprises a recessed containment for receiving the expanded intercalated graphite worms, said containment defined by a portion of the annular region having a thinner thickness.

12. The gasket as recited in claim 11, wherein the plate includes a radially outer portion having a thickness greater than the recessed containment, whereby a radially inner edge of the outer portion defines a wall that restricts movement of the seal material from the annular region while the gasket is used to seal a flange joint.

13. A gasket for sealing between two substantially parallel surfaces being connected together, comprising:

a plate formed with at least one opening;

a corrugated region between the opening and a peripheral edge of the plate defining a plurality of concentric deformable ridges that each define a peak and opposite facing grooves that each define a valley on respective opposing sides of the plate; and a plurality of intercalated graphite vermiform compressed around the corrugated region to form an integrally molded seamless jacket having uniform stability in all directions and overlying at least the corrugated region on respective opposing sides of the plate.

14. The gasket as recited in claim 13, wherein the jacket further comprises an integral sideface portion that is disposed inwardly of an edge of the opening in the plate and thereby the jacket seamlessly covers a side face of the opening in the plate.

15. The gasket as recited in claim 13, wherein the density of the compressed vermiform increasingly changes from a first density in the valleys of the grooves to a second density at the peaks of the ridges, said second density being greater than said first density.

16. The gasket as recited in claim 13, wherein the thickness of the compressed vermiform decreasingly changes from a first thickness in the valleys of the grooves to a second thickness at the peaks of the ridges, said second thickness being thinner than said first thickness.

17. The gasket as recited in claim 13, wherein the density of the compressed vermiform increasingly changes from a first density in the valleys of the grooves to a second density at the peaks of the ridges, said second density being greater than said first density, and wherein the thickness of the compressed vermiform decreasingly changes from a first thickness in the valleys of the grooves to a second thickness at the peaks of the ridges, said second thickness being thinner than said first thickness.

18. The gasket as recited in claim 13, further comprising an adhesive coating on at least the annular region on the opposing sides of the plate.

* * * * *

UNITED STATES PATENT AND TRADEMARK OFFICE
CERTIFICATE OF CORRECTION

PATENT NO. : 5,785,322
DATED : July 28, 1998
INVENTOR(S) : Steven M. Suggs and Reid M. Meyer It is certified that error appears in the above-identified patent and that said Letters Patent is hereby corrected as shown below:

In claim 1, lines 14 and 17, change "blanket" to --jacket--.
In claim 5, line 2, change "seal material" to --jacket--.
In claim 6, line 2, change "seal material" to --jacket--.
In claim 8, lines 1 and 2, change "seal material" to --jacket--.
In claim 9, line 1, change "blanket" to --jacket--.
In claim 9, line 2, change "worms" to --vermiform--.

Signed and Sealed this

Eleventh Day of May, 1999

Attest:

Attesting Officer

Q. TODD DICKINSON

Acting Commissioner of Patents and Trademarks